United States Patent
Park et al.

(10) Patent No.: US 9,503,967 B2
(45) Date of Patent: Nov. 22, 2016

(54) METHOD AND APPARATUS FOR SCANNING IN WIRELESS LAN

(71) Applicant: LG ELECTRONICS INC., Seoul (KR)

(72) Inventors: Giwon Park, Seoul (KR); Kiseon Ryu, Seoul (KR); Jinsam Kwak, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/424,921

(22) PCT Filed: Sep. 11, 2013

(86) PCT No.: PCT/KR2013/008230
§ 371 (c)(1),
(2) Date: Feb. 27, 2015

(87) PCT Pub. No.: WO2014/042434
PCT Pub. Date: Mar. 20, 2014

(65) Prior Publication Data
US 2015/0230162 A1    Aug. 13, 2015

Related U.S. Application Data

(60) Provisional application No. 61/699,786, filed on Sep. 11, 2012, provisional application No. 61/702,236, filed on Sep. 17, 2012.

(51) Int. Cl.
*H04W 4/00* (2009.01)
*H04W 48/16* (2009.01)
(Continued)

(52) U.S. Cl.
CPC ............ *H04W 48/16* (2013.01); *H04L 5/0055* (2013.01); *H04W 84/12* (2013.01); *H04W 88/08* (2013.01)

(58) Field of Classification Search
CPC ... H04W 48/00; H04W 48/02; H04W 48/08; H04W 48/16; H04W 48/18; H04W 48/20; H04W 84/12; H04W 88/08; H04L 5/0055
See application file for complete search history.

(56) References Cited

U.S. PATENT DOCUMENTS

| 7,716,379 B2 * | 5/2010 | Ruan ..................... G06F 13/387 709/224 |
| 7,876,704 B1 * | 1/2011 | Bims ...................... H04B 7/022 370/254 |

(Continued)

FOREIGN PATENT DOCUMENTS

JP    2009-533890    9/2009

OTHER PUBLICATIONS

Ryu, et al., "Probe Response Broadcasting," LG, doc.: IEEE 802.11.12/0550, May 2012, 12 pages.

(Continued)

*Primary Examiner* — Kevin Mew
(74) *Attorney, Agent, or Firm* — Lee, Hong, Degerman, Kang & Waimey

(57) ABSTRACT

A method for scanning by a STA can comprise the steps of: the STA unicasting a probe request frame to a target AP from a first channel, the target AP having been determined in accordance with a BSSID comprised in a primitive; the STA processing an ACK transmitted via the first channel within a first ACK transmission time, and determining whether the first ACK for the probe request frame is received; if the first ACK is received within the first ACK transmission time, then the STA monitoring a probe response frame, which is a response to the probe request frame from the first channel; and if the first ACK is not received within the first ACK transmission time, then regardless of a CCA level detected during the first ACK transmission time, the STA switching the scanning channel.

12 Claims, 18 Drawing Sheets

(51) Int. Cl.
*H04L 5/00* (2006.01)
*H04W 84/12* (2009.01)
*H04W 88/08* (2009.01)

(56) References Cited

U.S. PATENT DOCUMENTS

| | | | | |
|---|---|---|---|---|
| 8,953,498 B2* | 2/2015 | Kim | ............... | H04W 48/16 370/255 |
| 2004/0103278 A1* | 5/2004 | Abhishek | ............... | H04L 63/08 713/160 |
| 2005/0128988 A1* | 6/2005 | Simpson | ............... | H04W 48/16 370/338 |
| 2005/0135284 A1* | 6/2005 | Nanda | ............... | H04L 29/06068 370/294 |
| 2006/0111103 A1* | 5/2006 | Jeong | ............... | H04W 48/14 455/434 |
| 2006/0187873 A1* | 8/2006 | Friday | ............... | H04W 48/20 370/328 |
| 2006/0215601 A1* | 9/2006 | Vleugels | ............... | H04W 28/26 370/328 |
| 2010/0246502 A1 | 9/2010 | Gong et al. | | |
| 2011/0149850 A1* | 6/2011 | Sashihara | ............... | H04W 48/16 370/328 |
| 2012/0195296 A1* | 8/2012 | Adachi | ............... | H04W 16/14 370/338 |
| 2013/0155933 A1* | 6/2013 | Kneckt | ............... | H04W 74/002 370/312 |
| 2013/0231151 A1* | 9/2013 | Kneckt | ............... | H04W 40/246 455/515 |
| 2013/0294354 A1* | 11/2013 | Zhang | ............... | H04W 72/04 370/329 |

OTHER PUBLICATIONS

Park, et al., "Step-wise Active Scanning in TGai," LG, doc.: IEEE 802.11-12/0257r1, Mar. 2012, 11 pages.
Yunoki, "Proposal of Fast AP Discovery," KDDI R&D Laboratories, doc.: IEEE 11-12/0013r0, Jan. 2012, 29 pages.
PCT International Application No. PCT/KR2013/008230, Written Opinion of the International Searching Authority dated Jan. 29, 2014, 1 page.
Jarkko Kneckt, et al., "Normative text for active scanning meeting the requirements of the SFD", IEEE P802.11 Wireless LANs, doc.:IEEE 802.11-1210726r0, Jun. 1, 2012, 12 pages.
Jonathan Segev, et al., "Proposed 802.11ai Specification Text for Active Scanning Enhancement", IEEE P802.11 Wireless LANs, doc.:IEEE 80211-12/1040r0, Sep. 6, 2012, 6 pages.
European Patent Office Application No. 13836917.8, Search Report dated Apr. 13, 2016, 10 pages.
Park, et al., "Step-Wise Active Scanning in TGai," doc.: IEEE 802.11-12/0257r1, Mar. 2012, 10 pages.
Korean Intellectual Property Office Application Serial No. 10-2015-7006985, Office Action dated Feb. 22, 2016, 4 pages.

* cited by examiner

FIG. 1
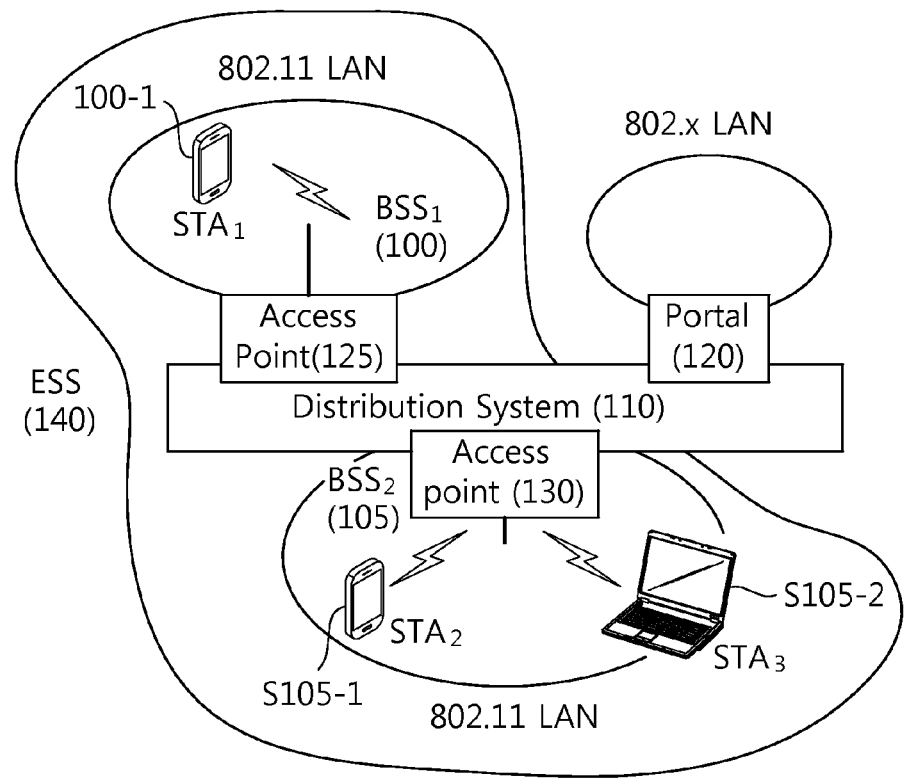
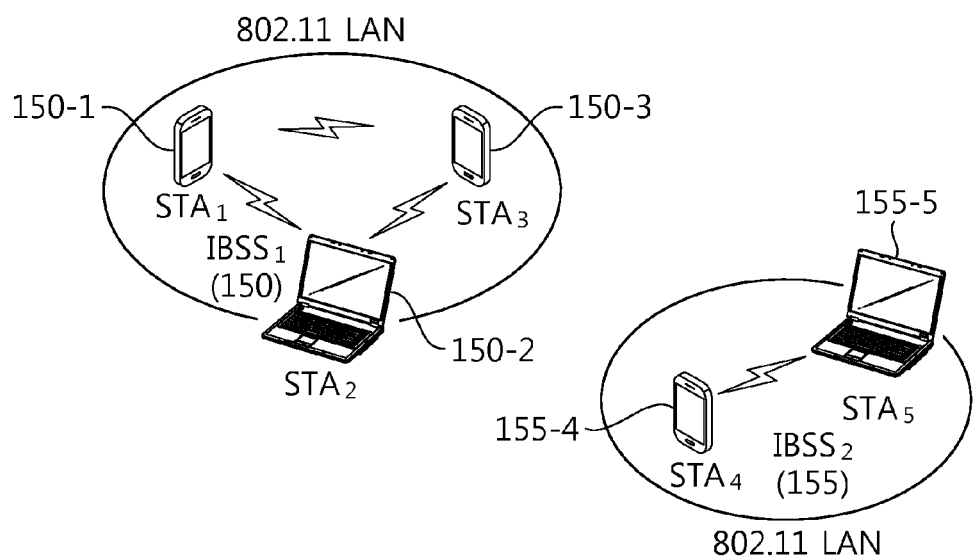

METHOD AND APPARATUS FOR SCANNING IN WIRELESS LAN

CROSS-REFERENCE TO RELATED APPLICATIONS

This application is the National Stage filing under 35 U.S.C. 371 of International Application No. PCT/KR2013/008230, filed on Sep. 11, 2013, which claims the benefit of U.S. Provisional Application Ser. No. 61/699,786, filed on Sep. 11, 2012 and 61/702,236, filed on Sep. 17, 2012, the contents of which are all hereby incorporated by reference herein in their entirety.

BACKGROUND OF THE INVENTION

1. Field of the Invention

The present invention relates to a method and an apparatus for scanning, and more particularly, to a method and an apparatus for scanning by a station (STA).

2. Related Art

In recent years, an evolution direction of a wireless LAN technique has been largely progressed into three directions. As an effort for further increasing a transmission speed on an extension line of the wireless LAN evolution direction in the related art, IEEE (institute of electrical and electronic engineers) 802.11ac and IEEE 802.11ad are provided. The IEEE 802.11ad is a wireless LAN technique using a 60 GHz band. Further, a wideband wireless LAN using a frequency band less than 1 GHz to enable wideband transmission distantatively rather than the wireless LAN in the related art has been come to the fore in recent years and includes IEEE 802.11af using a TV white space (TVWS) band and IEEE 802.11ah using a 900 MHz band. The wideband LANs mainly aim at extension of an extended range Wi-Fi service in addition to a smart grid and a wideband sensor network. Further, a wireless LAN medium access control (MAC) technique in the related art has a problem that an initial link setup time is significantly lengthened in some cases. An IEEE 802.11ai standardization activity has been recently in active progress in order for an STA to rapidly access an AP by solving the problem.

The standardization activity of the IEEE 802.11ai as an MAC technique that handles a rapid authentication procedure in order to epochally save an initial set-up and association time of the wireless LAN has been started as a legal task group in January 2011. In order to enable the rapid access procedure, the IEEE 802.11ai has discussed procedure simplification in regions such as AP discovery, network discovery, time synchronization function (TSF) synchronization, authentication and association, procedure merge with a higher layer, and the like. Among them, ideas including procedure merge using piggyback of a dynamic host configuration protocol (DHCP), optimization of a full extensible authentication protocol (EAP) using a concurrent IP, efficient selective access point (AP) scanning, and the like have been actively discussed.

SUMMARY OF THE INVENTION

The present invention provides a scanning method.
The present invention also provides a scanning apparatus.
In an aspect, a method for scanning by a station (STA) is provided. The method includes: the STA unicasting a probe request frame to a target access point (AP) from a first channel, the target AP having been determined in accordance with a basic service identifier (BSSID) comprised in an MLME.SCAN.request.primitive; the STA processing an acknowledgment (ACK) transmitted via the first channel within a first ACK transmission time, and determining whether the first ACK for the probe request frame is received; if the first ACK is received within the first ACK transmission time, then the STA monitoring a probe response frame, which is a response to the probe request frame from the first channel; and if the first ACK is not received within the first ACK transmission time, then regardless of a clear channel assessment (CCA) level detected during the first ACK transmission time, the STA switching the scanning channel from the first channel to a second channel when a timer for the first ACK transmission time expires.

In another aspect, a station (STA) that operates in a wireless LAN is provided. The STA includes: a radio frequency (RF) unit receiving a radio signal; and a processor selectively connected with the RF unit, wherein the processor may be implemented to unicast a probe request frame to a target access point (AP) which is an AP determined in accordance with a basic service identifier (BSSID) comprised in an MLME.SCAN.request.primitive from a first channel, process an acknowledgment (ACK) transmitted via the first channel within a first ACK transmission time, and determine whether the first ACK for the probe request frame is received, monitor a probe response frame, which is a response to the probe request frame from the first channel if the first ACK is received within the first ACK transmission time, and switch the scanning channel from the first channel to a second channel when a timer for the first ACK transmission time expires regardless of a clear channel assessment (CCA) level detected during the first ACK transmission time if the first ACK is not received within the first ACK transmission time.

A scanning procedure can be rapidly performed.

BRIEF DESCRIPTION OF THE DRAWINGS

FIG. 1 is a conceptual diagram illustrating a structure of a wireless local area network (WLAN).

DESCRIPTION OF EXEMPLARY EMBODIMENTS

FIG. 1 is a concept view illustrating the structure of a wireless local area network (WLAN).

The upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 230 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

The lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4, and 155-5 are managed in a distributed manner. In the IBSS, all of the STAs 150-1, 150-2, 150-3, 155-4, and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
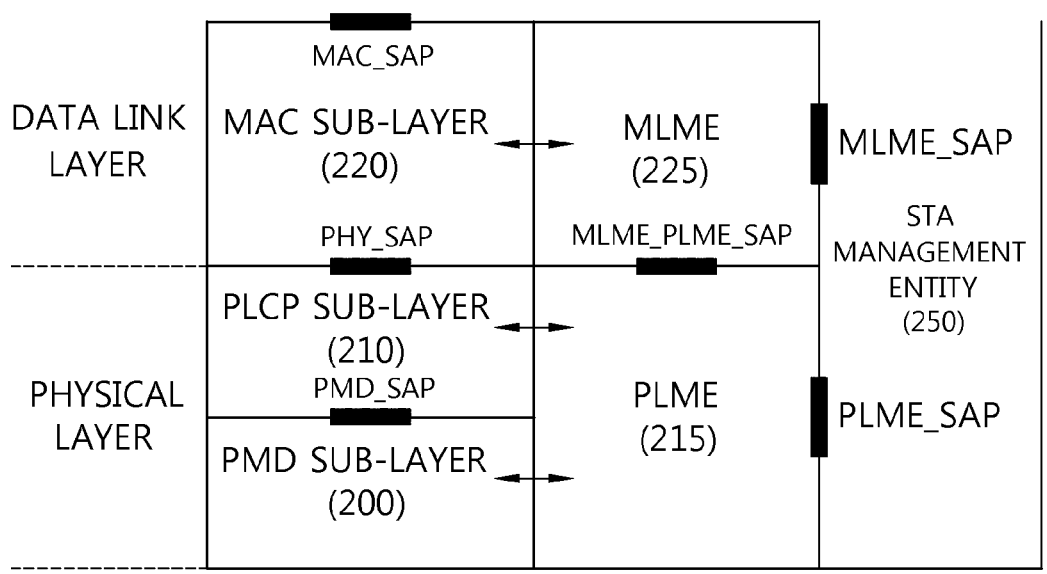
FIG. 2 is a diagram illustrating a hierarchical architecture of a wireless LAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 110 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Figure 3:
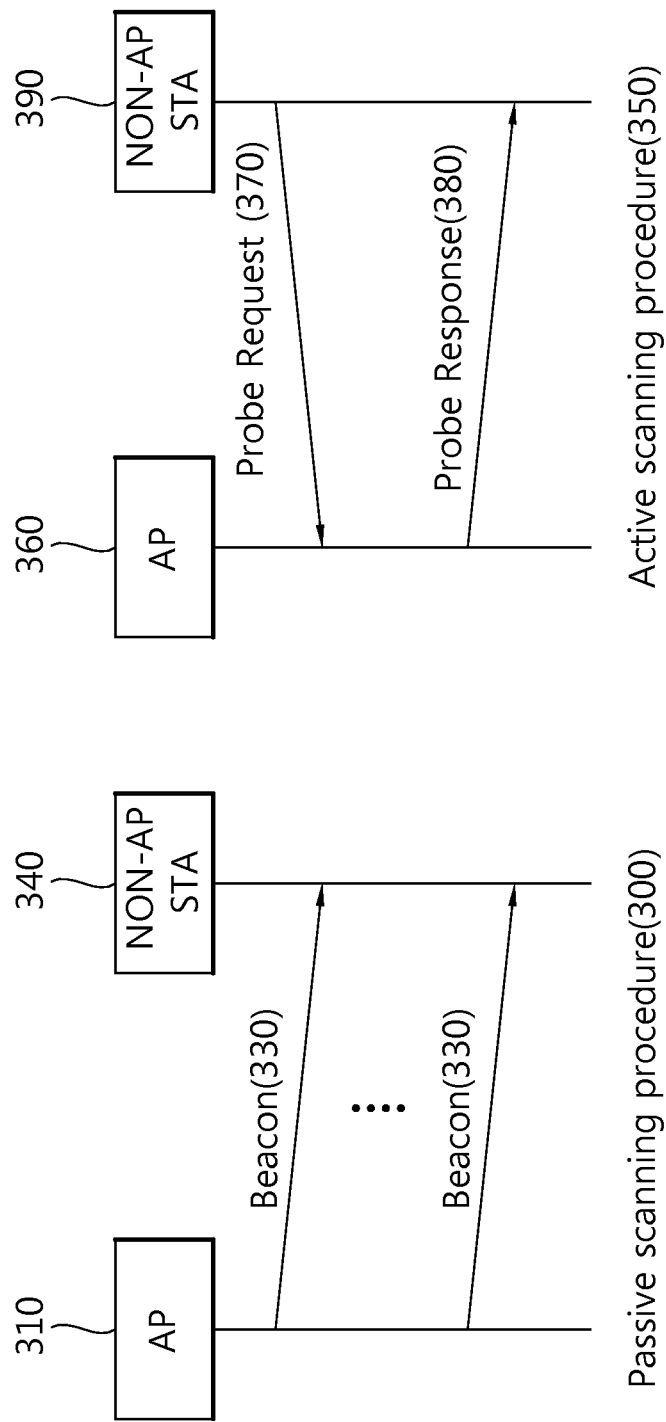
FIG. 3 is a conceptual diagram illustrating a scanning method in the wireless LAN.

FIG. 3 is a concept view illustrating a scanning method in a WLAN.

Referring to FIG. 3, the scanning method may be divided into passive scanning 300 and active scanning 350.

Referring to the left part of FIG. 3, the passive scanning 300 may be performed by a beacon frame 330 that is periodically broadcast from the AP 300. The AP 300 in the WLAN broadcasts the beacon frame 330 to the non-AP STA 340 at a particular period (e.g., per 100 msec). The beacon frame 330 may contain information on the current network. The non-AP STA 340 may perform scanning on the channel with the AP 310 to perform the authentication/association process by obtaining the network information from the beacon frame 330 periodically broadcast.

The passive scanning method 300 only receives the beacon frame 330 transmitted from the AP 310 without the need for the non-AP STA 340 to transmit a frame. Accordingly, the passive scanning 300 is advantageous of a reduction in the overall overhead that is created upon data transmission/reception over the network. However, since the scanning is obliged to be passively performed in proportion to the period of the beacon frame 330, the time taken to perform scanning may be increased. The details of the beacon frame are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter, IEEE 802.11)' 8.3.3.2 beacon frame disclosed on November, 2011. IEEE 802.11ai may additionally use other format of a beacon frame, and such beacon frame may be referred to as a FILS (fast initial link setup) beacon frame. Further, the measurement pilot frame is a frame containing only some information of the beacon frame, and the measurement pilot frame may be used in the scanning procedure. The measurement pilot frame is set forth in IEEE 802.11 8.5.8.3 measurement pilot format.

Also, a fast initial link setup (FILS) discovery frame may be defined. The FILS discovery frame is a frame transmitted between each of the transmission periods in each AP, may be a frame transmitted with a shorter period than the beacon frame. That is, the FILS discovery frame is a frame transmitted with a shorter period than a transmission period of the beacon frame. The FILS discovery frame may include identification information (SSID, BSSID) of an AP that transmits the FILS discovery frame. It may be implemented that the FILS discovery frame is transmitted to an STA before the beacon frame is transmitted, and thus, the STA may search that an AP is existed in the corresponding channel beforehand. An interval of which the FILS discovery frame is transmitted in one AP is referred to as an FILS discovery frame transmission interval. The FILS discovery frame may be transmitted with a part of information included in the beacon frame being included. The FILS discovery frame may also include information for a transmission time of the beacon frame of neighbor AP.

Referring to the right part of FIG. 3, the active scanning 350 refers to a method in which the non-AP STA 390 leads scanning by transmitting a probe request frame 370 to the AP 360.

After receiving the probe request frame 370 from the non-AP STA 390, the AP 360 may wait a random time to prevent frame collision, and the AP 360 then includes network information in a frame response frame 380, then sending the same to the non-AP STA 390. The non-AP STA 390 may obtain the network information based on the received probe response frame 380 to stop the scanning process.

The active scanning 350 allows the non-AP STA 390 to lead the scanning process, and the active scanning 350 has the advantage of a short scanning time. However, the non-AP STA 390 should transmit the probe request frame 37, resulting in an increase in the network overhead for frame transmission and reception. The probe request frame 370 is set forth in IEEE 802.11 Ch. 8.3.3.9, and the probe response frame 380 is set forth in IEEE 802.11 Ch. 8.3.3.10.

After the scanning is done, the AP and the STA may conduct an authentication and association procedure.

Figure 4:
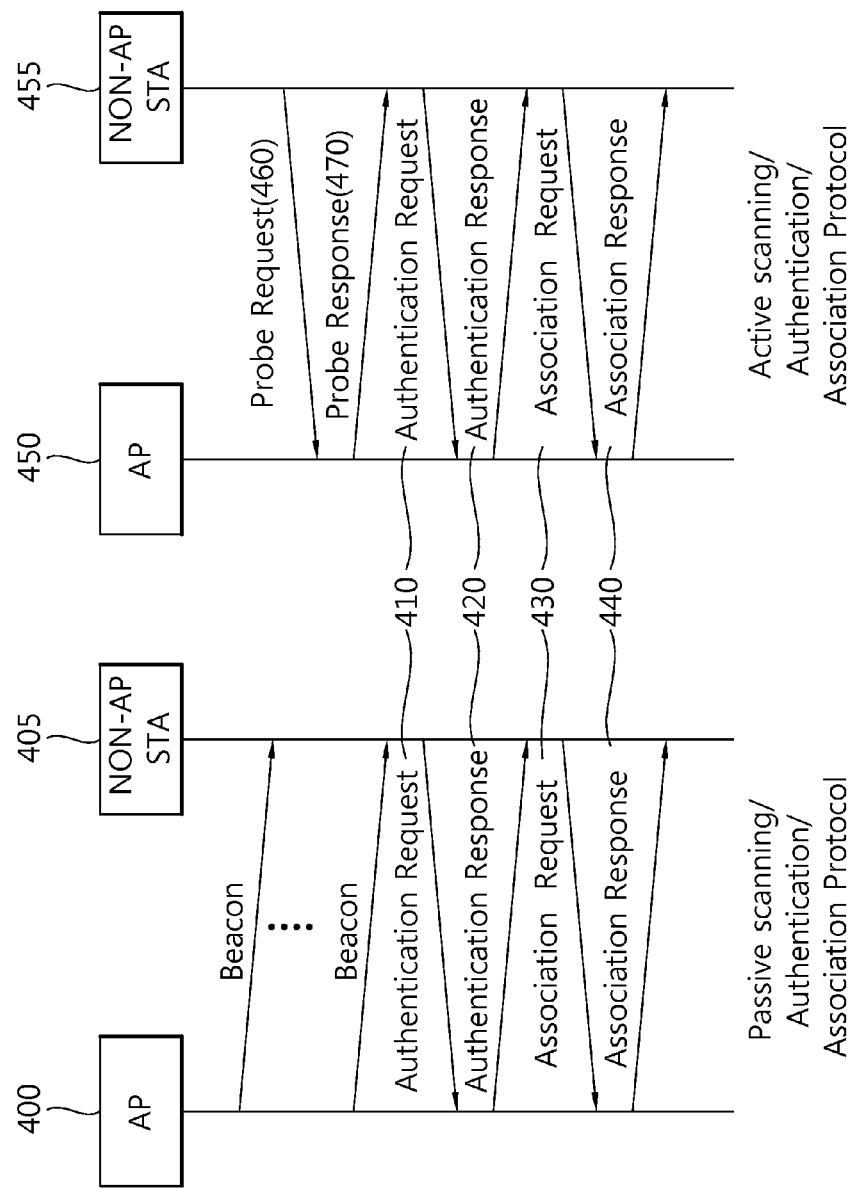
FIG. 4 is a conceptual diagram illustrating an authentication and association process after scanning by an AP and an STA.

FIG. 4 is a concept view illustrating an authentication and association process after scanning between an AP and an STA.

Referring to FIG. 4, after passive/active scanning, the authentication and association may be conducted with one of the scanned APs.

The authentication and association process may be carried out by way of, e.g., 2-way handshaking. The left part of FIG. 4 is a concept view illustrating an authentication and association process after passive scanning, and the right part of FIG. 4 is a concept view illustrating an authentication and association after active scanning.

The authentication and association process may be equally performed by exchanging an authentication request frame 410 authentication response frame 420 and an association request frame 330 association response frame 440 between the AP 400 or 450 and the non-AP STA 405 or 455 regardless of which one of the active scanning method and the passive scanning method has been used.

The authentication process may be conducted by transmitting the authentication request frame 410 from the non-AP STA 405 or 455 to the AP 400 or 450. In response to the authentication request frame 410, the authentication response frame 420 may be transmitted from the AP 400 or 450 to the non-AP STA 405 or 455. The authentication frame format is set forth in IEEE 802.11 Ch. 8.3.3.11.

The association process may be conducted by transmitting the association request frame 430 from the non-AP STA 405 or 455 to the AP 400 or 405. In response to the association request frame 430, the association response frame 440 may be transmitted from the AP 405 or 455 to the non-AP STA 400 or 450. The transmitted association request frame 430 contains information on the capability of the non-AP STA 405 or 455. Based on the information on the capability of the non-AP STA 405 or 455, the AP 400 or 350 may determine whether the non-AP STA 405 or 355 may be supported. In case such support is possible, the AP 300 or 450 may include in the association response frame 440 whether to accept the association request frame 440 and a reason therefore, and its supportable capability information, and the AP 300 or 450 may send the same to the non-AP STA 405 or 455. The association frame format is set forth in IEEE 802.11 Chs. 8.3.3.5/8.3.3.6.

After the association step is done, normal data transmission and reception is carried out. The association, unless done, is re-conducted based on the reason for which the association is not performed, or association with other AP may be performed.

Figure 5:
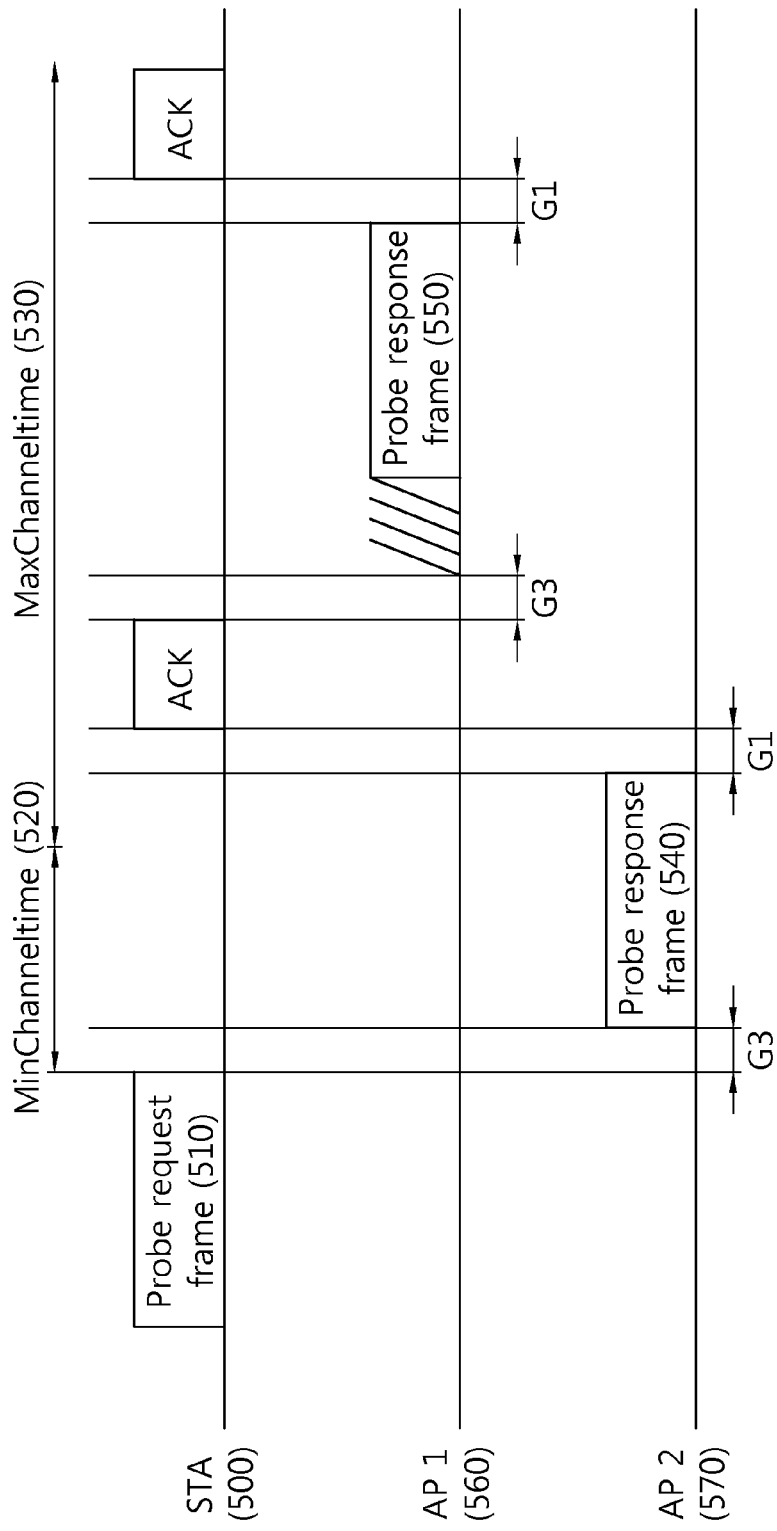
FIG. 5 is a conceptual diagram of an active scanning procedure.

FIG. 5 is a concept view illustrating an active scanning procedure.

Referring to FIG. 5, the active scanning procedure may be performed in the following steps.

(1) It is determined whether the STA 500 is ready to perform the scanning procedure.

The STA 500 may wait, e.g., until the probe delay time expires or particular signaling information (for example, PHY-RXSTART.indication primitive) is received to perform active scanning.

The probe delay time is a delay that occurs before the STA 500 sends a probe request frame 510 when performing active scanning. PHY-RXSTART.indication primitive is a signal that is transmitted from the physical (PHY) layer to the local MAC (medium access control) layer. PHY-RXSTART.indication primitive may signal information indicating that the PLCP (physical layer convergence protocol) has received a PPDU (PLCP protocol data unit) including a valid PLCP header to the MAC layer.

(2) Basic access is performed.

In the 802.11 MAC layer, a number of STAs may share a radio medium using a distributed coordination function (DCF) that is a contention-based function. The DCF may prevent collision between STAs through a back-off scheme using the carrier sense multiple access/collision avoidance (CSMA/CA) as its access protocol. The STA 500 may transmit the probe request frame 510 to the APs 560 and 570 using a basic access method.

(3) Information for specifying the APs 560 and 570 included in MLME-SCAN.request primitive (for example, SSID (service set identification) and BSSID (basic service set identification) information) may be included in the probe request frame 510 and may be transmitted.

The BSSID may have a value corresponding to the MAC address of the AP as an indicator to specify the AP. The SSID (service set identification) is a network term for specifying an AP, which may be read by a person who operates the STA. The BSSID and/or SSID may be used to specify an AP.

The STA 500 may specify an AP based on the information to specify the APs 560 and 570 included by MLME-SCAN.request primitive. The specified APs 560 and 570 may send the probe response frames 550 and 550 to the STA 500. The STA 500 may include the SSID and BSSID information in the probe request frame 510 and send the same, thereby unicasting, multicasting, or broadcasting the probe request frame 510. A method of unicasting, multicasting, or broadcasting the probe request frame 510 using the SSID and BSSID information is further described with reference to FIG. 5.

For example, in case an SSID list is included in MLME-SCAN.request primitive, the STA 500 may include the SSID list in the probe request frame 510 and transmit the same. The APs 560 and 570 may receive the probe request frame 510, determine the SSIDs included in the SSID list contained in the received probe request frame 510, and determine whether to send the probe response frames 550 and 550 to the STA 200.

(4) A probe timer is initialized as 0 and is then operated.

The probe timer may be used to check a minimum channel time (MinChanneltime, 520) and a maximum channel time (MaxChanneltime, 530). The minimum channel time 520 and the maximum channel time 530 may be used to control the active scanning operation of the STA 500.

The minimum channel time 520 may be used to perform the operation for varying the channel for conducting active scanning. For example, in case the STA 500 fails to receive the probe response frames 550 and 550 until a probe timer reaches the minimum channel time 520, the STA 500 shifts scanning channels to perform scanning on other channel. In case the STA 500 receives the probe response frame 550 until the probe timer reaches the minimum channel time 520, it may process the received probe response frames 540 and 550 after waiting until the probe timer reaches the maximum channel time 530.

The STA 500 may detect PHY-CCA.indication primitive until the probe timer reaches the minimum channel time 520 and may determine whether other frame (for example, probe response frames 540 and 550) has been received by the STA 500 until before the minimum channel time 520.

PHY-CCA.indication primitive may transmit information on the state of the medium from the physical layer to the MAC layer. PHY-CCA.indication primitive may indicate the current state of the channel using channel state parameters such as "busy" when the channel is unavailable and "idle" when the channel is available. The STA 500 may determine that there are probe response frames 550 and 550 received by the STA 500 when PHY-CCA.indication is detected to be busy and may determine that there are no probe response frames 550 and 550 received by the STA 500 when PHY-CCA.indication is detected to be idle.

In case PHY-CCA.indication is detected to be idle, the STA 500 may set an NAV (net allocation vector) to 0, and the STA 500 may scan a next channel. In case PHY-CCA.indication is detected to be busy, the STA 500 may perform a process on the received probe response frames 550 and 550 after the probe timer reaches the maximum channel time 530. After the process on the received probe response frames 550 and 550 is done, the STA 500 may set the NAV (net allocation vector) to 0 and may then scan a next channel.

Hereinafter, in embodiments of the present invention, determining whether there are probe response frames 550 and 550 received by the STA 500 may also mean that the channel state is determined using PHY-CCA.indication primitive.

(5) In case all the channels included in the channel list (ChannelList) are scanned, the MLME may signal MLME-SCAN.confirm primitive. MLME-SCAN.confirm primitive may contain BSSDescriptionSet including all the information obtained in the scanning process.

In case the STA 500 uses the active scanning method, the STA 500 should perform monitoring to determine whether the parameter of PHY-CCA.indication is busy until the probe timer reaches the minimum channel time.

The specific information included in the above-described MLME-SCAN is as follows. In order for the STA to perform scanning, the MLME may receive MLME-SCAN.request primitive. MLME-SCAN.request primitive is a primitive created by the SME. MLME-SCAN.request primitive may be used to determine whether there is other BSS to which the STA is to be connected.

MLME-SCAN.request primitive may contain information specifically such as BSSType, BSSID, SSID, ScanType, ProbeDelay, ChannelList, MinChannelTime, MaxChannelTime, RequestInformation, SSID List, ChannelUsage, AccessNetworkType, HESSID, MeshID, VendorSpecificInfo. The details of MLME-SCAN.request primitive are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications' 6.3.3.2 MLME-SCAN.request disclosed on November, 2011.

The following Table 1 briefly represents example information included in MLME-SCAN.request primitive.

TABLE 1

| name | description |
| --- | --- |
| BSSType | Determines whether infrastructure BSS, IBSS, MBSS (Mesh basic service set), or all, are included in the scan |
| BSSID | Identifies a specific or wildcard BSSID |
| SSID | Specifies the desired SSID or the wildcard SSID |
| ScanType | Indicates either active or passive scanning |
| ProbeDelay | Delay(in microseconds) to be used prior to transmitting a probe frame during active scanning |
| ChannelList | Specifies a list of channels that are examined when scanning for a BSS |
| MinChannelTime | The minimum time(in TU) to spend on each channel when scanning |
| MaxChannelTime | The maximum tine(in TU) to spend on each channel when scanning |
| RequirementInformation | This element is optionally present if dot11RadioMeasurementActivated is true and is placed in a Probe Request frame to request that the responding STA include the requested information in the Probe Response frame |
| SSID List | One or more SSID elements that are optionally present when dot11MgmtOptionSSIDListActivated is true |
| ChannelUsage | Specific request types for the ChannelUsage request |
| AccessNetworkType | Specifies a desired specific access network type or the wildcard access network type |
| HESSID | Specifies the desired specific HESSID network identifier or the wildcard network identifier. This field is present when dot11InterworkingSeviceActivated is true |
| Mesh ID | Only present if BSSType = MESH or BSSType = ANY_BSS. Specifies the desired Mesh ID or wildcard Mesh ID. |
| RequestParameters | The parameters define the responding STAs |
| ReportingOption | Indicates the result reporting mode |
| APConfigurationChangeCount | When a specific BSSID is indicated in the MLME-SCAN.request, the APConfigurationChangeCount associated with the stored configuration of the AP is optionally provided |
| VendorSpecificInfo | Information added according to each of vendors |

The request parameter included in MLME-SCAN.request primitive may be used to determine whether the responding STA is to transmit a probe response frame. The request parameter may contain information for requesting that other BSS's information be included in the probe response frame. Also, the request parameter may include a report request field, a delay reference field, and a maximum delay limit field.

The report request field contains information to request that other BSS's information be included in the probe response frame, the delay reference field contains information on the delay type applied as a response to the probe request frame, and the maximum delay limit field may contain the maximum access delay information on the delay type indicated by the delay reference field.

Besides, the request parameter may include a minimum data rate field and/or a received signal strength limit field. The minimum data rate field contains information on the lowest overall data rate in transmitting an MSDU or A-MSDU. The received signal strength limit field may further contain information on the limit value of the signal necessary for a recipient of the probe request frame to respond.

Figure 6:
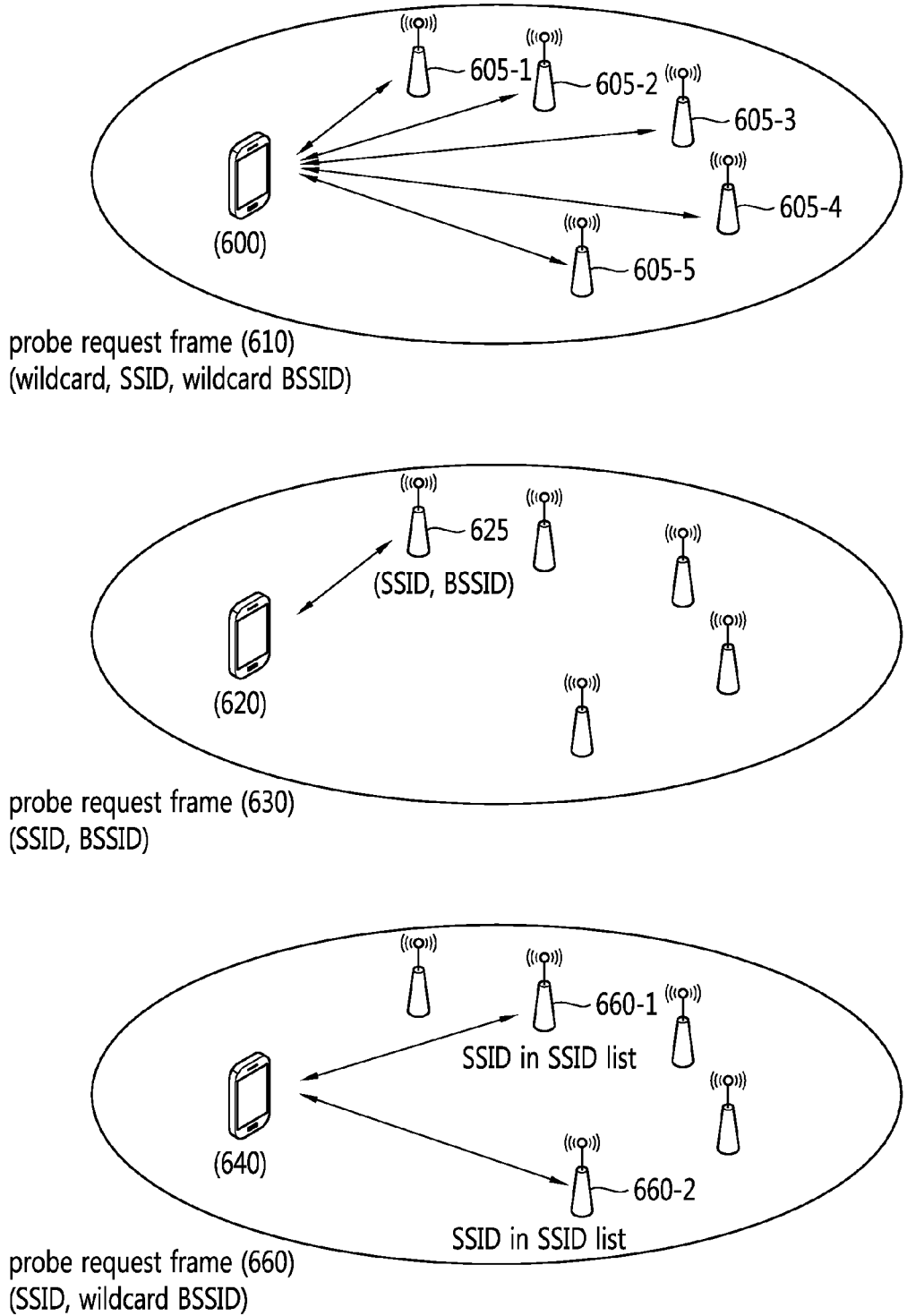
FIG. 6 is a conceptual diagram illustrating a method for transmitting a probe request frame.

FIG. 6 is a concept view illustrating a probe request frame transmission method.

FIG. 6 discloses methods of broadcasting, multicasting, and unicasting probe request frames from an STA.

The upper part of FIG. 6 shows a method in which the STA 600 broadcasts the probe request frame 610.

The STA 600 may include a wildcard SSID and a wildcard BSSID in the probe request frame 610 and broadcast the probe request frame 610.

The wildcard SSID and the wildcard BSSID may be used as identifiers to indicate all of the APs 606-1, 606-2, 606-3, 606-4, and 606-6 included in the transmission range of the STA 600.

In case the STA 600 transmits the probe request frame 610 with the wildcard SSID and the wildcard BSSID included in the probe request frame 610, the APs 606-1, 606-2, 606-3, 606-4, and 606-6 that have received the probe request frame 610 from the STA 600 may send probe response frames to the STA 600 in response to the received probe request frame.

In case the APs 606-1, 606-2, 606-3, 606-4, and 606-6 that have received the broadcast probe request frame 610 send the probe response frames to the STA 600 in response to the received probe request frame 610 within a predetermined time, the problem may occur that the STA 600 should simultaneously receive and process too many probe response frames.

The middle part of FIG. 6 shows a method in which the STA 620 unicasts the probe request frame 630.

Referring to the middle part of FIG. 6, in case the STA 620 unicasts the probe request frame 630, the STA 620 may transmit the probe request frame 630 containing particular SSID/BSSID information of the AP. Among the APs that receive the probe request frame 630, only the AP 626 corresponding to the SSID/BSSID specified by the STA 620 may transmit a probe response frame to the STA 620.

The lower part of FIG. 6 shows a method in which the STA 640 multicasts the probe request frame 660.

Referring to the lower part of FIG. 6, the STA 640 may include an SSID list and a wildcard BSSID in the probe request frame 660 and transmit the same. Among the APs receiving the probe request frame 660, the APs 660-1 and 660-2 corresponding to the SSIDs included in the SSID list contained in the probe request frame may transmit a probe response frame to the STA 640.

In the existing active scanning procedure, the STA sequentially unicasts, multicasts, or broadcasts the probe request frame to the respective channels and the AP waits for the probe response frame. When the AP does not exist in the channel to which the probe request frame is transmitted, a scanning delay occurs until the scanning channel moves to a next channel. In general, the STA transmits the probe request frame to the AP and waits for the probe response frame for a minimum channel time (minchanneltime) (for example, 5 ms). When the probe response frame is not transmitted from the AP for the minimum channel time, the STA may find the AP by scanning the next channel. The scanning delay may have approximately a value given by Equation 1 below.

$$\text{Scan delay} = \text{number of channel} * \text{probe delay} + \text{probe request transmission time} + \text{minchanneltime} \quad <\text{Equation 1}>$$

When the STA performs the channel access, the STA needs to rapidly perform the channel access by decreasing the scanning delay.

Figure 7:
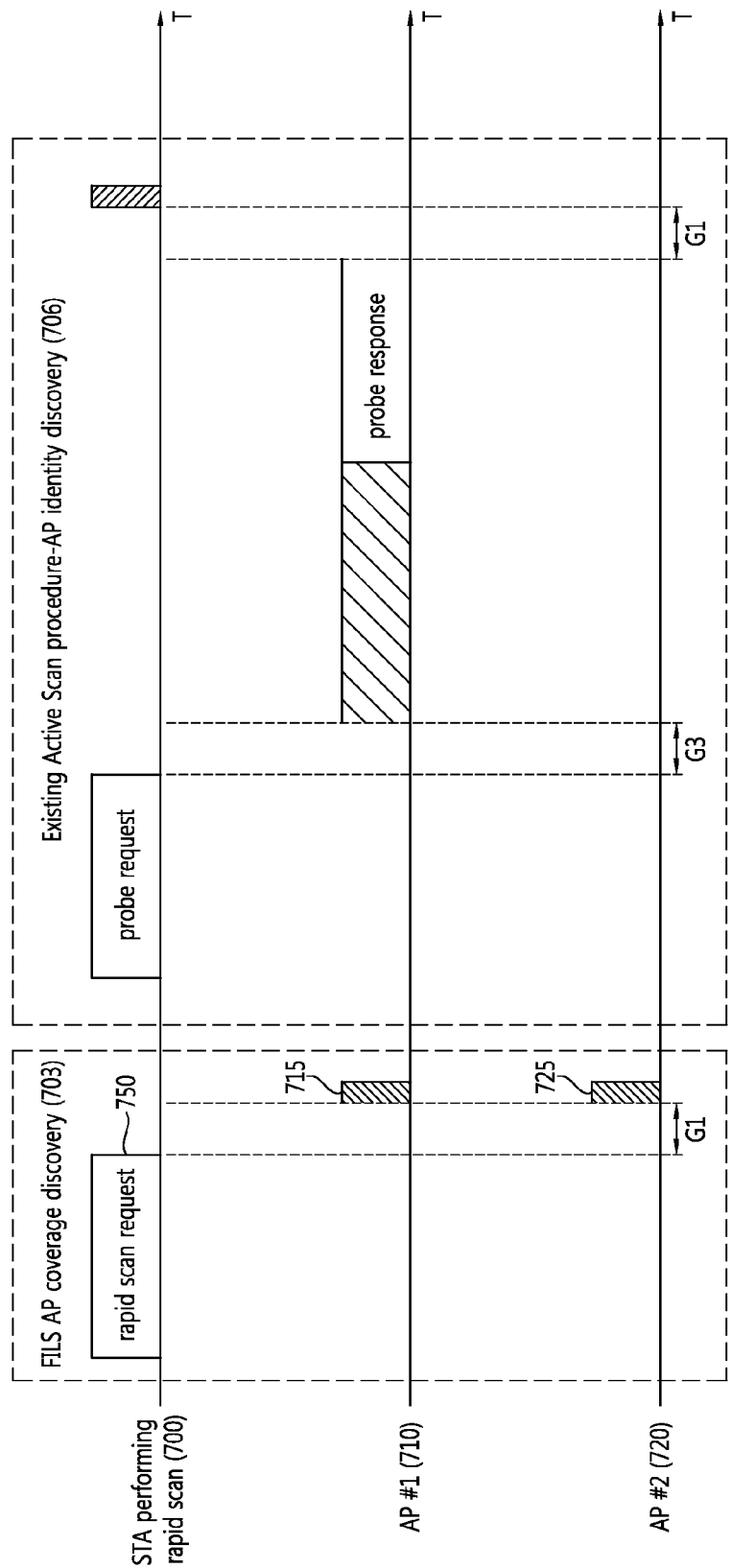
FIG. 7 is a conceptual diagram illustrating a scanning procedure.

FIG. 7 is a conceptual diagram illustrating a scanning procedure.

Referring to FIG. 7, an STA 700 may scan APs 710 and 720 through an advance AP discovery procedure 703 and an existing active scanning procedure 706. The advance AP discovery procedure 703 may be a procedure for discovering whether the APs 710 and 720 exist around the STA 700 before performing the existing active scanning procedure 706.

In the advance AP discovery procedure 703, the STA 700 may broadcast a rapid scan request frame 750 to all channels. The APs 710 and 720 that receive the rapid scan request frame 750 which exists in the channel may transmit ACKs 715 and 725 as a response to the rapid scan request frame 750. The STA 700 may determined only whether a frame received from the outside exists based on clear channel assessment (CCA) without decoding the ACKs 715 and 725 transmitted by the APs 710 and 720. That is, when the CCA is performed with respect to the ACKs 715 and 725 transmitted by the APs 710 and 720 to determine that the ACKs 715 and 725 are busy in a PHY-CCA.indication primitive, it is determined that the AP exists around the STA and the existing active scanning procedure is performed. The AP discovery procedure is performed before performing the existing active scanning procedure to perform the existing active scanning procedure only when the AP is discovered by the advance AP discovery procedure. By using such a method, a total scan delay may be reduced. However, the following problems may occur in the scanning procedure.

First, an effect of the reduction of the scanning delay due to a signaling storm may be reduced. It may be assumed that the APs are scattered around the STA. In this case, all APs that receive the rapid scanning request frame transmit the ACK because the STA broadcasts the rapid scanning request frame and when the ACK transmits a signaling of the STA which was coupled in the related art, the signaling storm may occur. In this case, the AP performs a back-off procedure in order to transmit the ACK and when multiple APs transmit the ACK and further, a transmission time of the transmitted ACK overlaps with the signaling transmitted to the STA which was coupled in the related art, the delay of the ACK transmission increases. Accordingly, the effect of reducing the scanning delay may be reduced.

Further, a false alarm regarding existence of the neighboring APs may occur. The STA recognizes the reception of the ACK transmitted by the AP through the PHY-CCA.indication. Accordingly, even when the STA actually detects that not the ACK of the rapid scan request frame but a signal transmitted by another STA is busy through the PHY-CCA.indication, it may be determined that the ACK is the ACK for the rapid scan request frame and the existing active scanning procedure may be performed.

Figure 8:
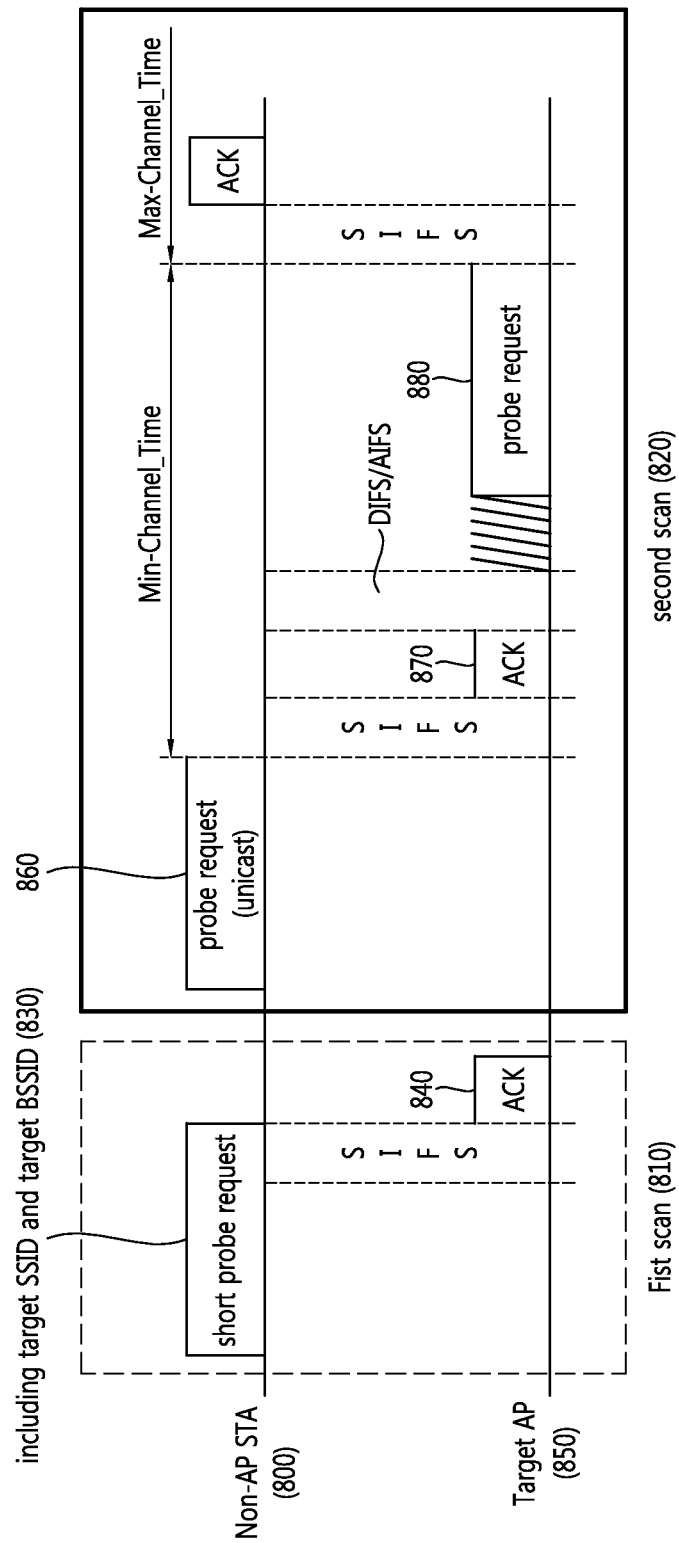
FIG. 8 is a conceptual diagram illustrating a scanning method according to an embodiment of the present invention.

FIG. 8 is a conceptual diagram illustrating a scanning method according to an embodiment of the present invention.

Referring to FIG. 8, the scanning procedure according to the embodiment of the present invention may be performed through a first scanning procedure 810 and a second scanning procedure 820.

In the first scanning procedure 810, an STA 800 may transmit a short probe request frame 830 including identifier information (a target BSSID and a target SSID) of a target AP 850 to each channel. The STA 800 may transmit the short probe request frame 830 to the target AP 850 by a multicast or unicast method. FIG. 8 discloses a case in which the STA 800 unicasts the short probe request frame 830 for easy description.

When the short probe request frame 830 is transmitted, the target SSID may be included in the short probe request frame 830, but only the target BSSID may be included in the short probe request frame 830. When an ACK 840 transmitted by the target AP 850 is received by the STA 800 as a response to the short probe request frame 830 transmitted by the STA 800, the STA 800 may find that the target AP 850 exists.

When the STA 800 receives the ACK 840 from the target AP 850 through the first scanning procedure 810, the STA 800 may access the target AP 850 through the second scanning procedure 820. In the second scanning procedure 820, the STA 800 may unicast a probe request frame 860 to the target AP 850. After an SIFS that receives the probe request frame 860, an ACK 870 may be transmitted to the STA 800 in order to indicate that the target AP 850 receives the unicasted probe request frame. After the target AP 850 transmits the ACK 870, the target AP 850 may transmit a probe response frame 880 to the STA 800 as a response to the probe request frame 860.

The STA 800 may not receive the ACK 840 from the target AP 850 through the first scanning procedure 810. In this case, the STA 800 may stop the scanning procedure and switch the scanning procedure to another channel.

According to the embodiment of the present invention, the ACK is unicasted to prevent the signaling storm. Further, it is determined whether the ACK is received as the response to the unicasted short probe request frame, not the procedure that detects the CCA to prevent false determination of the existence of the neighboring APs.

Figure 9:
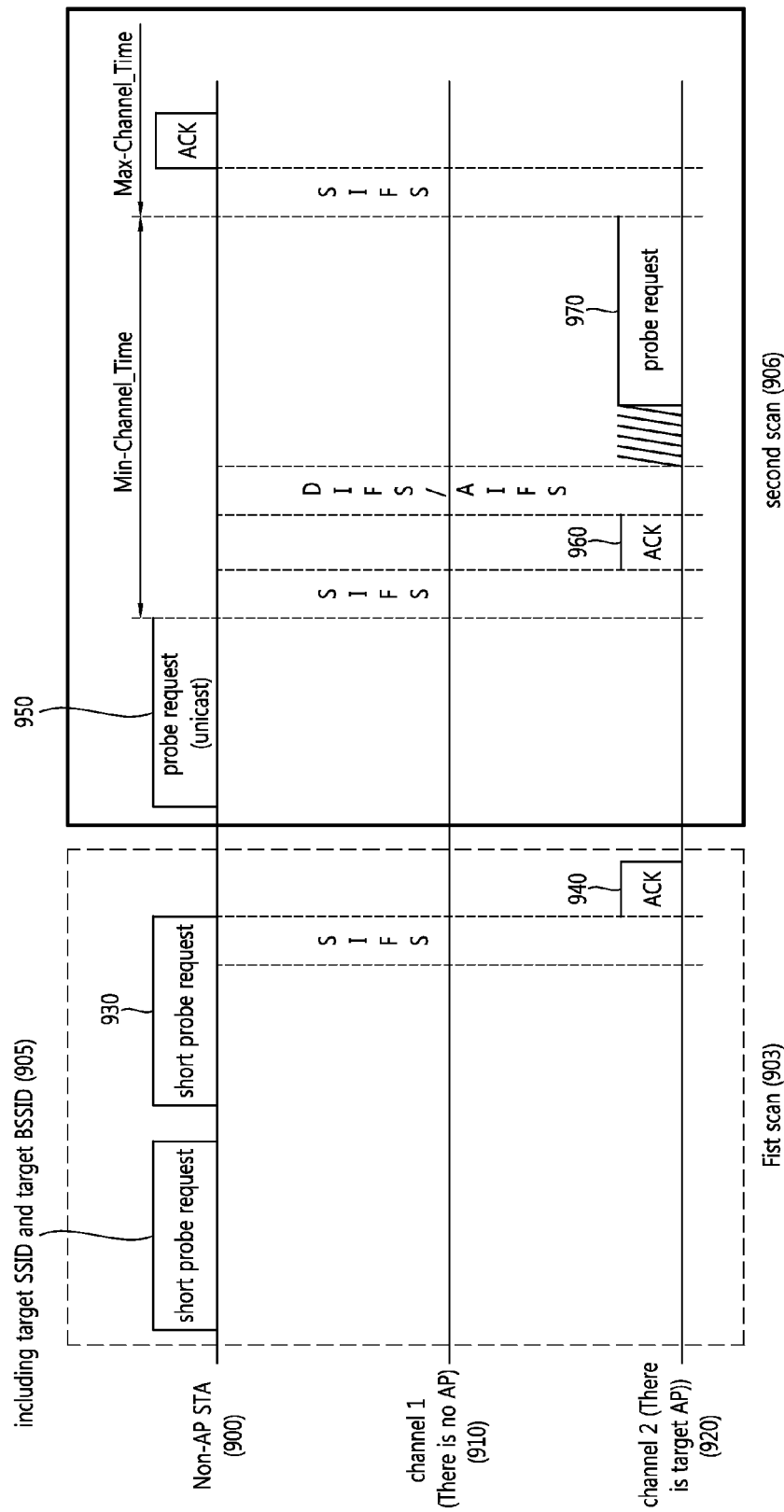
FIG. 9 is a conceptual diagram illustrating a scanning method according to an embodiment of the present invention.

FIG. 9 is a conceptual diagram illustrating a scanning method according to an embodiment of the present invention.

FIG. 9 discloses an AP scanning method of an STA 900 when an ACK 940 is not received until a specific time expires after the STA 900 transmits a short probe request frame 905. A specific time set for determining whether to receive the ACK may be shorter than the minimum channel time (minchanneltime) used in the existing active scanning procedure.

Referring to FIG. 9, the ACK may not be received until the specific time expires after the short probe request frame 905 is transmitted through a first channel 910. In this case, the STA 900 may perform scanning by moving the scanning channel to a second channel 920. The STA 900 may transmit a short probe request frame 930 by specifying the target AP in the second channel 920. An AP that operates in the second channel may transmit the ACK to the STA 900 as a response to receive the short probe request frame.

The STA 900 that receives the ACK 940 may transmit a probe request frame 950 through the second channel 920 by specifying the target AP. The target AP may SIFS and thereafter, transmit an ACK 960 that responds to receiving the probe request frame 950 transmitted by the STA 900. The target AP may transmit a probe response frame 970 to the STA 900 by performing the channel access after a predetermined time elapses.

Figure 10:
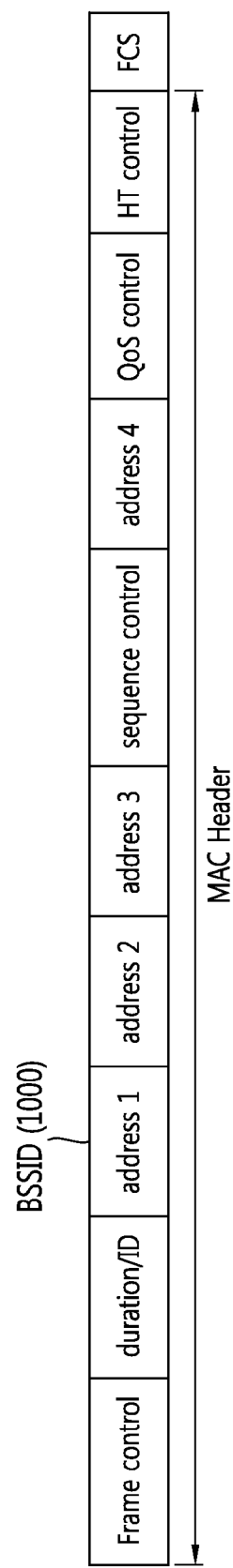
FIG. 10 is a conceptual diagram illustrating a short probe request frame according to an embodiment of the present invention.

FIG. 10 is a conceptual diagram illustrating a short probe request frame according to an embodiment of the present invention.

FIG. 10 discloses a format of a short probe request frame which the STA unicasts to a specific AP in the first scanning procedure.

Referring to FIG. 10, the short probe request frame may include only an MAC header and an FCS. Address 1 field 1000 of the MAC header may include the BSSID of the target AP. The STA may unicast the short probe request frame to the specific AP corresponding to the BSSID.

The short probe request frame for rapid scanning may be transmitted by multicast as well as unicast.

Figure 11:
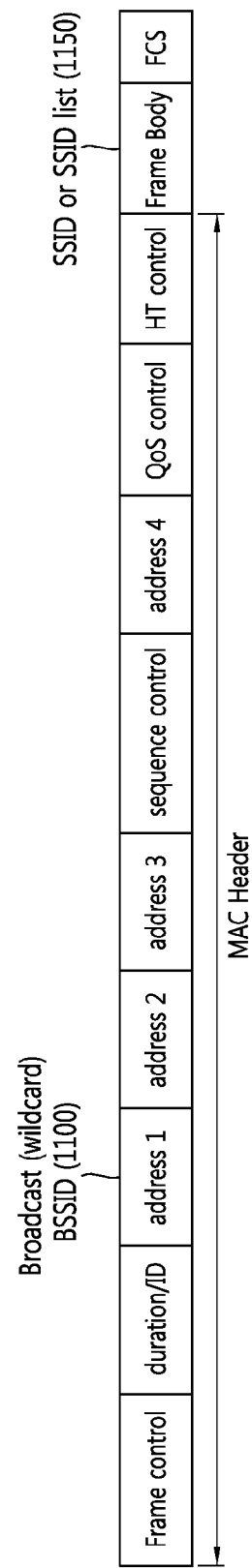
FIG. 11 is a conceptual diagram illustrating a short probe request frame according to an embodiment of the present invention.

FIG. 11 is a conceptual diagram illustrating a short probe request frame according to an embodiment of the present invention.

FIG. 11 discloses a format of the short probe request frame which the STA multicasts to the specific AP in the first scanning procedure.

Referring to FIG. 11, the short probe request frame may include only the MAC header, a frame body, and the FCS.

Address 1 field 1100 of the MAC header of the multicasted short probe request frame may include a broadcast (wildcard) BSSID. The frame body 1150 may information on a target SSID or SSID list. The STA may broadcast the short probe request frame to an AP corresponding to the SSID.

In the first scanning procedure disclosed in the present invention, the short probe request frame is transmitted based on the unicast or multicast to prevent the signaling storm and false ACK detection. That is, only the specific AP transmits the ACK to prevent the signaling storm and it is determined whether the ACK is received as the response to the unicasted or multicasted short probe request frame, not the procedure to detect the CCA to prevent the false determination of the existence of the neighboring APs, which occurs due to the detection of only the CCA.

According to another embodiment of the present invention, the short probe request frame is generated based on not a management frame format including the MAC header and the frame body but a control frame format to perform the rapid scanning procedure. The control frame format may include the MAC header and the FCS.

Figure 12:
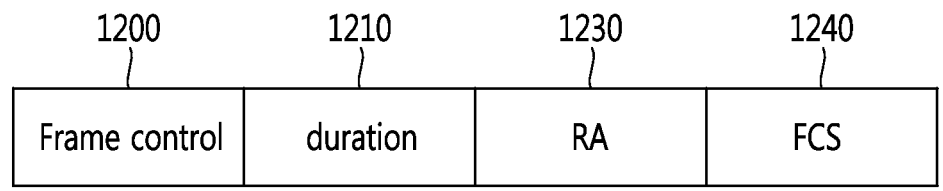
FIG. 12 is a conceptual diagram illustrating a control frame based short probe request frame according to an embodiment of the present invention.

FIG. 12 is a conceptual diagram illustrating a control frame based short probe request frame according to an embodiment of the present invention.

Referring to FIG. 12, the short probe request frame may include a frame control 1200, a duration 1210, an RA 1230, and a frame check sequence (FCS) 1240.

The frame control 1200 may include information associated with a frame, such as a protocol version, a type a sub type, retry, power management, and the like. A sub field of the frame control 1200 is disclosed in 8.2.4.1 Frame Control field of "IEEE Standard for Information Technology—Telecommunications and information exchange between systems—Local and metropolitan area networks—Specific requirements Part 11: Wireless LAN Medium Access Control (MAC) and Physical Layer (PHY) Specifications" in a document of IEEE Draft P802.11-REVmb™/D12, November 2011 disclosed in November 2011.

In the duration 1210, 8.2.4.2 duration/ID field, FCS of the document is disclosed in 8.2.4.8 FCS of the document.

The receiver address (RA) 1230 field may include only identifier information of the specific AP, which is indicated in an MLME.SCAN-request primitive. That is, the RA 1230 field may include a specific BSSID for unicasting or multicasting the short probe request frame.

However, in the embodiment of the present invention, that is, when the STA receives the MLME.SCAN-request primitive including the specific BSSID, the specific BSSID included in the RA of the short probe request frame that proposes the specific BSSID may be transmitted. APs that receive the short probe request frame transmitted by the STA transmit the ACK only when the BSSID of the AP and the BSSID of the short probe request frame coincide with each other.

In this case, the STA determines that the ACK transmitted by the AP is busy through the PHY-CCA.indication based on the CCA to determine that an AP transmitting the ACK exists. As another method, an MAC address of the STA as a transmitter transmitting the short probe request frame, which is included in the RA field of the ACK frame may be transferred. However, a transmit address (TA) field does not exist in the short probe request frame of FIG. 12. Accordingly, the RA field of the ACK frame may not include an address of the STA.

Therefore, in the present invention, when the short probe request frame is transmitted in the format of the short probe request frame of FIG. 12, a broadcast address is included in the RA field of the ACK frame to transmit a broadcast ACK.

Figure 13:
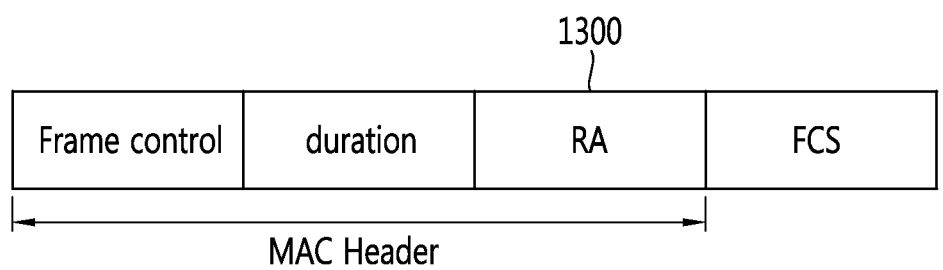
FIG. 13 is a conceptual diagram illustrating an ACK frame format according to an embodiment of the present invention.

FIG. 13 is a conceptual diagram illustrating an ACK frame format according to an embodiment of the present invention.

Referring to FIG. 13, the AP that receives the control frame based short probe request frame disclosed in FIG. 12 may transmit the broadcast ACK with the broadcast address being included in the RA 1300 of the ACK.

Further, according to another embodiment of the present invention, the identifier information of the STA that transmits the short probe request frame proposed in FIG. 12 may be included in the ACK in order to transmit the ACK frame by the unicast. That is, the AP specifies the RA 1300 based on the identifier information of the STA that transmits the short probe request frame to transmit the specified RA 1300 to the STA.

Figure 14:
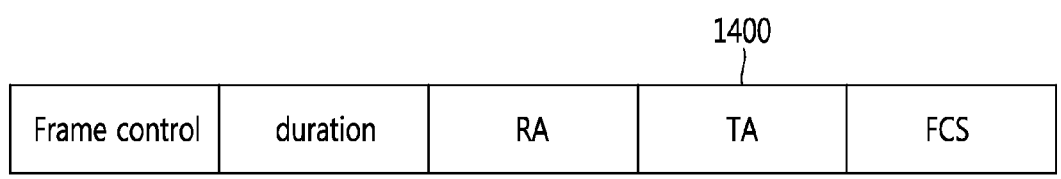
FIG. 14 is a conceptual diagram illustrating a short probe request frame according to an embodiment of the present invention.

FIG. 14 is a conceptual diagram illustrating a short probe request frame according to an embodiment of the present invention.

Referring to FIG. 14, the short probe request frame may include a transmitter address (TA) 1400. An address of the STA that transmits the short probe request frame may be included in the TA 1400. The AP that receives the short probe request frame including the TA 1400 unicasts the ACK with the address included in the TA field 1400 of the short probe request frame being included in the RA field of the ACK at the time of transmitting the ACK. That is, the AP may perform a unicast based ACK procedure based on the short probe request frame disclosed in FIG. 14.

Figure 15:
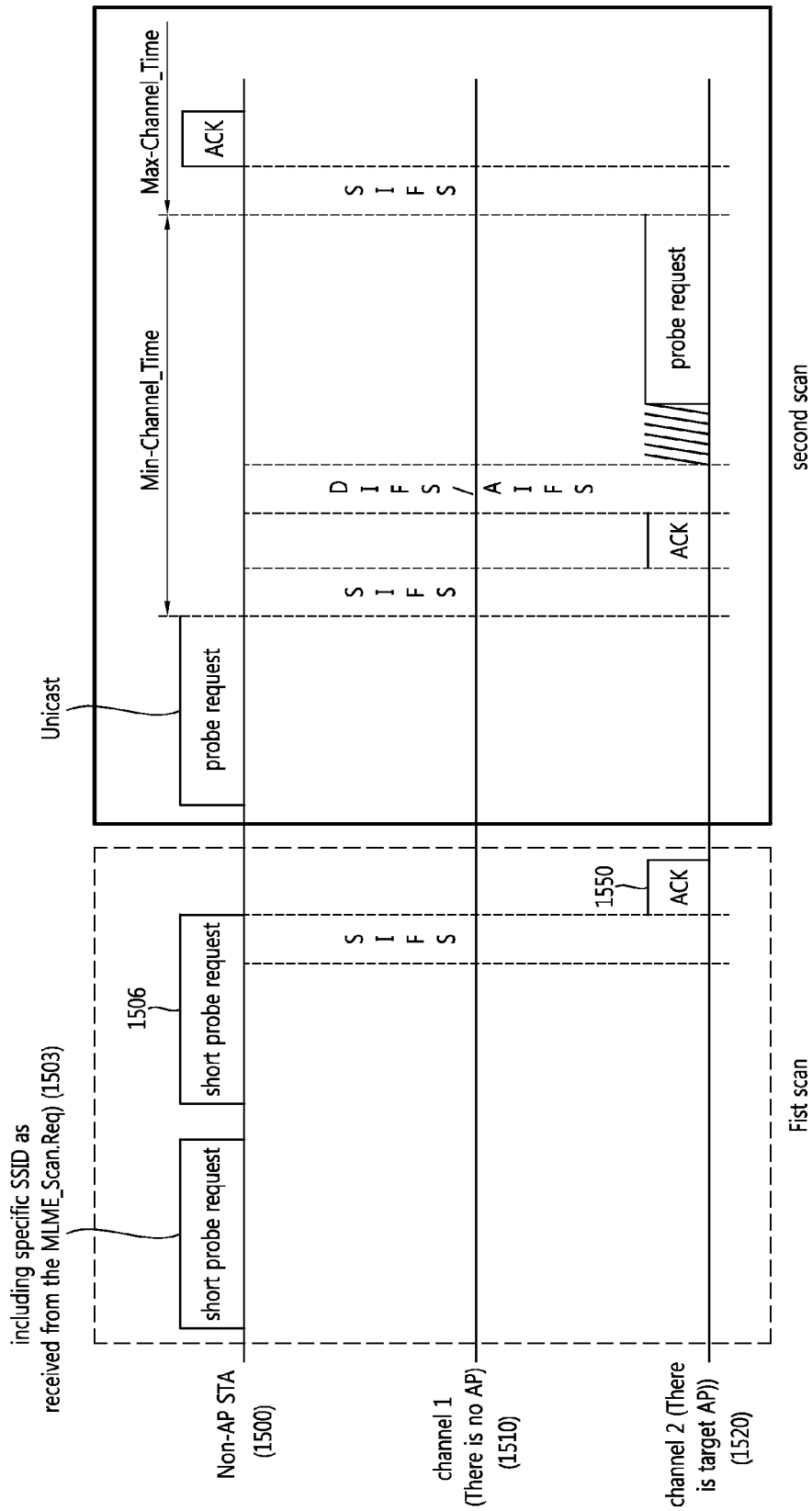
FIG. 15 is a conceptual diagram illustrating a scanning procedure by an STA according to an embodiment of the present invention.

FIG. 15 is a conceptual diagram illustrating a scanning procedure by an STA according to an embodiment of the present invention.

FIG. 15 discloses the case in which the STA transmits control frame based short probe request frames 1503 and 1506 including the TA.

Referring to FIG. 15, the STA 1500 may transmit the short probe request frame 1503 to a first channel 1510. When the target AP that operates in the first channel 1510 does not exist, the STA 1500 may not receive an ACK as a response to the short probe request frame 1503.

When STA may not receive the ACK as the response to the short probe request frame 1503 from the first channel 1510, the STA 1500 may transmit the short probe request frame 1506 to the second channel 1520. When the target AP that operates in the second channel 1520 exists, the STA 1500 may not receive an ACK 1550 as the response to the short probe request frame 1506 from the second channel 1520. The AP may unicast the ACK 1550 to the STA 1500 that transmits the short probe request frame 1506 based on the TA included in the short probe request frame 1506. The AP may decide an RA field to be included in the ACK 1550 based on the TA of the received short probe request frame 1506 and unicast the ACK 1550 as the response to the short probe request frame 1506 to the specified STA 1500.

Figure 16:
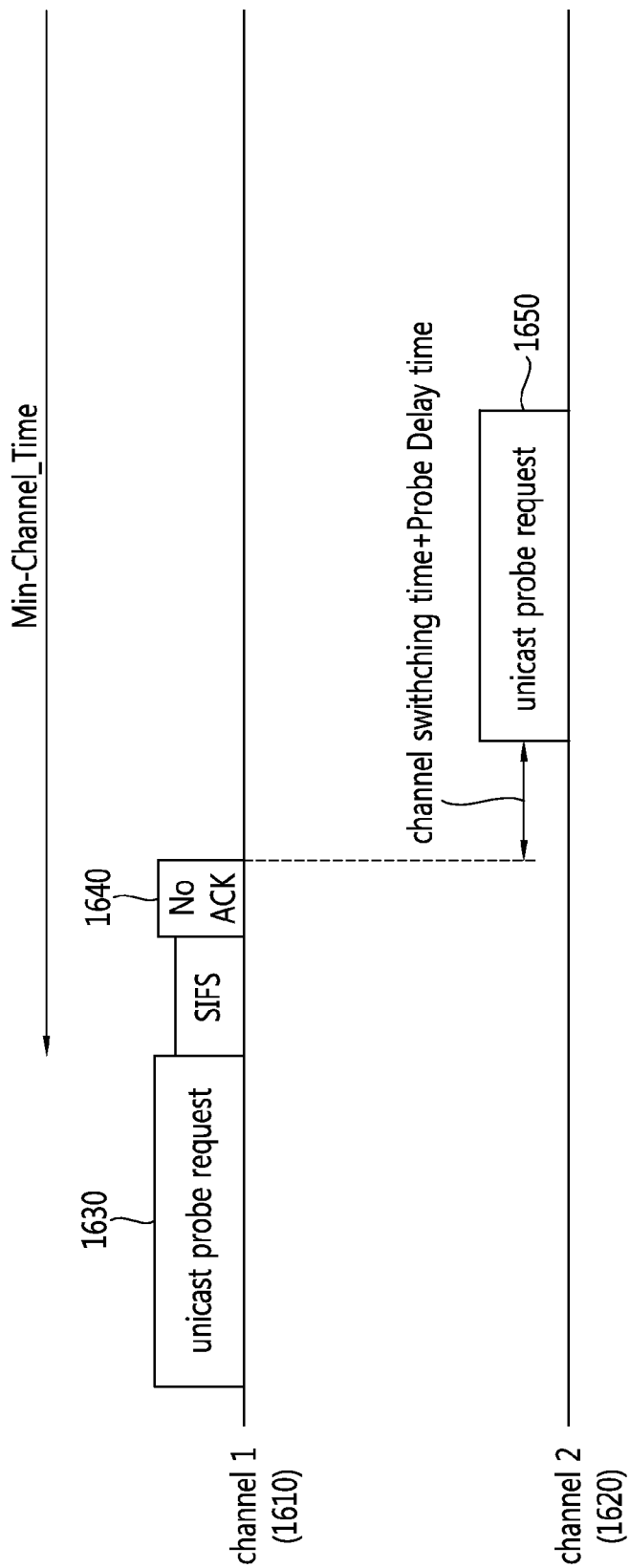
FIG. 16 is a conceptual diagram illustrating a scanning method by an STA according to an embodiment of the present invention.

FIG. 16 is a conceptual diagram illustrating a scanning method by an STA according to an embodiment of the present invention.

FIG. 16 discloses a method in which the STA detects whether to transmit the ACK from the AP to decide whether to switch the scanning channel at the time of performing the scanning procedure.

Referring to FIG. 16, the timing when the STA switches the scanning channel may vary depending on whether to receive the ACK as a response to a probe request frame 1630 transmitted in the second scanning procedure. For example, when the STA receives the ACK as the response to the transmitted probe request frame 1630, the STA may receive the probe response frame by waiting until a maximum channel time and process the received probe response frame similarly to the existing scanning procedure.

However, when the STA may not receive the ACK as the response to the transmitted probe request frame 1630 (1640), the STA may rapidly perform the channel switching through a scanning procedure other than the existing scanning procedure. In the existing scanning procedure, it is determined whether the transmitted frame exists by monitoring the channel through the CCA until the minimum channel time (MinChannelTime) and when the frame is not detected through the CCA until the minimum channel time, the STA moves to another channel.

However, according to the embodiment of the present invention, even when the existence of the frame received as a result of monitoring the channel through the CCA is detected, in the case where the STA may not receive the ACK as the response to the transmitted probe request frame, the STA may switch the scanning channel without waiting until the minimum channel time unlike the existing scanning procedure.

For example, the STA may unicast the probe request frame 1630 to an access point (AP) in the first channel 1610. The target AP may an AP decided based on the basic service set identifier (BSSID) included in the MLME.SCAN-request primitive. The STA processes the ACK transmitted through the first channel 1610 within an acknowledgement (ACK) transmission time to determine whether to receive the ACK for the probe request frame. For example, the STA may decode the ACK and determine whether the receiver address (RA) field of the ACK acquired by decoding the ACK and an identifier of the STA correspond to each other in order to determine whether the received ACK is the ACK for the probe request frame by processing the received ACK. The ACK transmission time may be a time corresponding to the (short interframe space (SIFS). As yet another embodiment, the ACK transmission time may be set to a value shorter than the minimum channel time. It may be determined whether The ACK transmission time expires based on a timer.

When the ACK for the probe request frame is received within the ACK transmission time, the STA may monitor the probe response frame as the response to the probe request frame in the first channel 1610. Whereas, when the ACK for the probe request frame is not received within the ACK transmission time, the STA may set a network allocation vector (NAV) to 0. Further, when the ACK for the probe request frame is not received within the ACK transmission time, the STA may switch the scanning channel from the first channel to the second channel at the time when the timer for the ACK transmission time expires regardless of a clear channel assessment (CCA) level detected for the ACK transmission time.

A value acquired by adding a channel switching time and a probe delay time may be required until the STA unicasts the probe request frame 1650 in the second channel 1620. The scanning method by the STA disclosed in FIG. 16 may also be performed in combination with the first scanning procedure described in FIGS. 8, 9, and 10.

Figure 17:
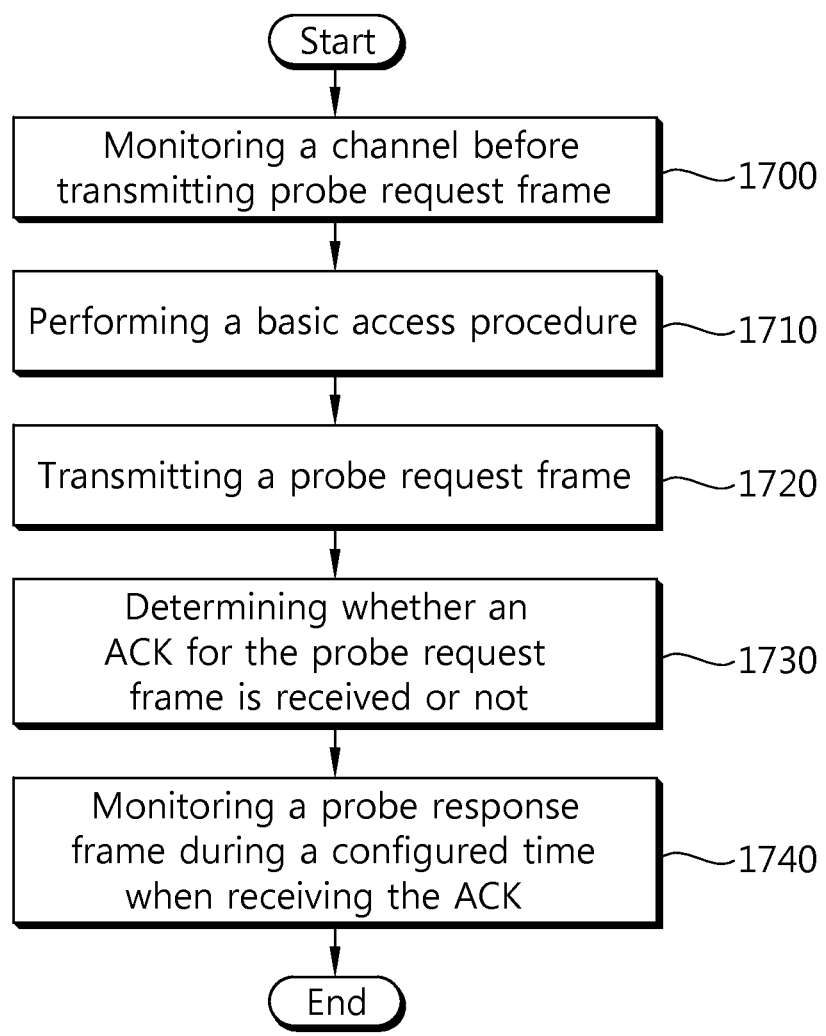
FIG. 17 is a conceptual diagram illustrating a scanning procedure by an STA according to an embodiment of the present invention.

FIG. 17 is a conceptual diagram illustrating a scanning procedure by an STA according to an embodiment of the present invention.

Referring to FIG. 17, the STA monitors a channel before transmitting the probe request frame (step S1700).

When the probe delay time expires and a PHYRxStart.indication primitive is received, the STA may transmit the probe request frame. The STA may discover whether a frame transmitted around the STA exists by monitoring the channel for the probe delay time and transmit the probe request frame only when the transmitted frame exists.

A basic access procedure is performed (step S1710).

A resource to transmit the probe request frame is acquired through the basic access procedure.

The probe request frame is transmitted (step S1720).

When a specific condition is met, the STA may broadcast the probe request frame or transmit the probe request frame to individual target addresses. When the SSID list exists in the MLME-SCAN.request primitive, the STA may transmit one or more probe request frames. The STA may set the probe request frame based on the SSID and the BSSID based on the MLME-SCAN.request primitive.

The STA determines whether the ACK is transmitted as the response to the probe request frame (step S1730).

According to the embodiment of the present invention, when the probe request frame is transmitted to individual destination addresses in step S1730 and the ACK frame is not detected until the probe timer reaches the ACK transmission time (ACKtimeout), the NAV may be set to 0 and a next channel may be scanned. The ACK transmission time may be a time to wait for the ACK indicating whether to receive the probe request frame after transmitting the probe request frame. The STA may wait for the ACK as the response to the probe request frame until the timer for the ACK transmission time expires. When the ACK is received until the ACK transmission time, the STA may receive the probe response frame as the response to the probe request frame by waiting until the minimum channel time or the maximum channel time.

When the ACK for the probe request frame is received within the ACK transmission time, the STA may monitor the probe response frame as the response to the probe request frame. Whereas, when the ACK for the probe request frame is not received within the ACK transmission time, the STA may set the network allocation vector (NAV) to 0. Further, when the ACK for the probe request frame is not received within the ACK transmission time, the STA may switch the scanning channel from the first channel to the second channel at the time when the timer for the ACK transmission time expires regardless of the clear channel assessment (CCA) level detected for the ACK transmission time. By using such a method, the STA may not unnecessarily wait until the minimum channel time and rapidly perform the scanning procedure.

When the ACK is transmitted as the response to the probe request frame, the STA monitors and receives the probe response frame for a set time (step S1740).

When the ACK is received as the response to the probe request frame, the STA may receive the probe response frame by monitoring the probe response frame transmitted by the AP until the minimum channel time or the maximum channel time without switching the scanning channel to another channel. The STA processes the received probe response frame.

When dot11FILSActiveated has a value of true, the STA may process a received beacon frame, a measurement pilot, and an FILS discovery frame. Further, the STA transmits a MLME-SCAN.confirm primitive when the dot11FILSActiveated has the value of true, ReportingOption is IMMEDIATE, and a new AP or new information on the AP is detected. The MLME-SCAN.confirm primitive may include Result-Code which is INTERMEDIATE_SCAN_RESULT and BSSDescriptionSet including the detected information on the AP. The MLME-SCAN.confirm primitive may be a primitive for terminating the scanning procedure.

Further, in the case where the dot11FILSActivated is true and the ReportingOption is CHANNWL_SPECIFIC, the STA transmits the MLME-SCAN.confirm primitive when the probe timer reaches the MaxChannelTime. The MLME-SCAN.confirm primitive may include the Result-Code which is INTERMEDIATE_SCAN_RESULT and BSSDescriptionSet including the information on the AP detected in the scanned channel.

Figure 18:
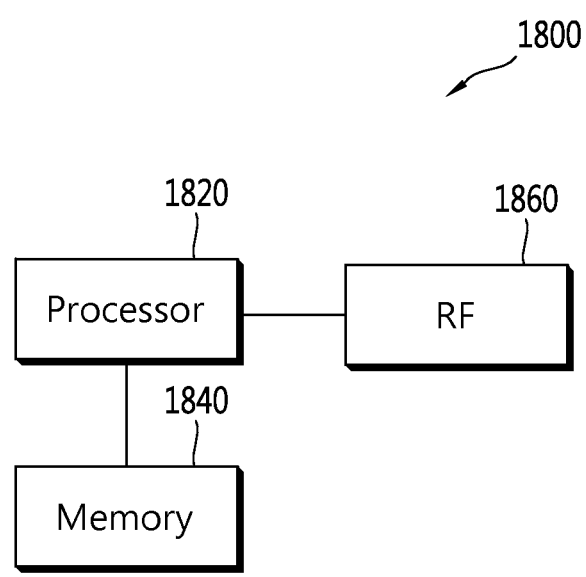
FIG. 18 is a block diagram illustrating a wireless apparatus to which the embodiment of the present invention can be applied.

FIG. 18 is a block diagram illustrating a wireless device to which an embodiment of the present invention may apply.

Referring to FIG. 18, the wireless device 1800 may be an STA that may implement the above-described embodiments, and the wireless device 1800 may be an AP or a non-AP STA (station).

The wireless device 1800 includes a processor 1820, a memory 1840, and an RF (Radio Frequency) unit 1860.

The RF unit 1860 may be connected with the processor 1820 to transmit/receive radio signals.

The processor 1820 implements functions, processes, and/or methods as proposed herein. For example, the processor 1820 may be implemented to perform the operation of the above-described wireless device according to an embodiment of the present invention.

For example, when the radio device is the AP, the processor 1820 may be implemented to transmit the short probe request frame unicasted by the STA and/or the ACK and the probe response frame as the response to the probe request frame.

Further, when the radio device is the STA, the processor 1820 the processor 1820 may be implemented to unicast the probe request frame to the target access point (AP) which is the AP decided based on the basic service set identifier (BSSID) included in the MLME.SCAN-request primitive in the first channel and processes the ACK transmitted through the first channel within the acknowledgement (ACK) transmission time to determine whether to receive the ACK for the probe request frame and when the ACK for the probe request frame is received within the ACK transmission time, monitor the probe response frame as the response to the probe request frame in the first channel.

In addition, when the ACK for the probe request frame is not received within the ACK transmission time, the processor 1820 may be implemented to switch the scanning channel from the first channel to the second channel at the time when the timer for the ACK transmission time expires regardless of the clear channel assessment (CCA) level detected for the ACK transmission time.

Further, the processor 1820 may be implemented to decode the received ACK and determine whether the receiver address (RA) field of the ACK acquired by the ACK and the identifier of the STA correspond to each other.

The processor 1820 may include an ASIC (Application-Specific Integrated Circuit), other chipset, a logic circuit, a data processing device, and/or a converter that performs conversion between a baseband signal and a radio signal. The memory 1840 may include a ROM (Read-Only Memory), a RAM (Random Access Memory), a flash memory, a memory card, a storage medium, and/or other storage device. The RF unit 1860 may include one or more antennas that transmit and/or receive radio signals.

When an embodiment is implemented in software, the above-described schemes may be embodied in modules (processes, or functions, etc.) performing the above-described functions. The modules may be stored in the memory 1840 and may be executed by the processor 1820. The memory 1840 may be positioned in or outside the processor 1820 and may be connected with the processor 1820 via various well-known means.

What is claimed is:
1. A method for scanning by a station (STA), comprising:
unicasting, by the STA, a short probe request frame to a target access point (AP) via a first channel,
wherein the target AP is determined based on a basic service identifier (BSSID) included in an MAC Layer Management Entity (MLME).SCAN.request.primitive;
unicasting, by the STA, a probe request frame to a the target AP via the first channel when receiving a first acknowledgement (ACK) transmitted by the target AP as a response to the short probe request frame,
wherein the short probe request frame is transmitted before the probe request frame is transmitted via the first channel;
determining, by the STA, whether a second ACK for the probe request frame is received via the first channel within a second ACK transmission time;

monitoring, by the STA, for a probe response frame, as a response to the probe request frame, on the first channel if the second ACK is received within the second ACK transmission time; and switching, by the STA, a scanning channel from the first channel to a second channel regardless of a clear channel assessment (CCA) level detected during the second ACK transmission time when a timer for the second ACK transmission time expires if the second ACK is not received within the second ACK transmission time.

2. The method of claim 1, further comprising:
configuring, by the STA, a network allocation vector (NAV) to 0 if the second ACK is not received within the second ACK transmission time.

3. The method of claim 1,
wherein the second ACK transmission time is a short interframe space (SIFS).

4. The method of claim 1, wherein the determining, by the STA, whether the second ACK for the probe request frame is received via the first channel within a second ACK transmission time comprises:
decoding the second ACK, and
determining whether a receiver address (RA) field of the decoded second ACK corresponds an identifier of the STA.

5. The method of claim 1,
wherein the short probe request frame includes only a medium access control (MAC) header and a frame check sequence (FCS),
wherein the MAC header includes an address field, and
wherein the address field includes a basic service set identifier (BSSID) of the AP.

6. The method of claim 1,
wherein the short probe request frame includes a transmitter address (TA) field,
wherein the TA field includes identifier information of the STA transmitting the short probe request frame, and
wherein the first ACK includes a receiver address (RA) field determined based on the identifier information of the STA.

7. A station (STA) operating in a wireless LAN, the STA comprising:
a radio frequency (RF) unit receiving a radio signal; and
a processor operatively connected with the RF unit and configured to:
unicast a short probe request frame to a target access point (AP) via a first channel,
wherein the target AP is determined based on a basic service identifier (BSSID) included in an MAC Layer Management Entity (MLME).SCAN.request-.primitive;

unicast a probe request frame to a the target AP via the first channel when receiving a first acknowledgement (ACK) transmitted by the target AP as a response to the short probe request frame,
wherein the short probe request frame is transmitted before the probe request frame is transmitted via the first channel;
determine whether a second ACK for the probe request frame is received via the first channel within a second ACK transmission time;
monitor for a probe response frame, as a response to the probe request frame, on the first channel if the second ACK is received within the second ACK transmission time; and
switch a scanning channel from the first channel to a second channel regardless of a clear channel assessment (CCA) level detected during the second ACK transmission time when a timer for the second ACK transmission time expires if the second ACK is not received within the second ACK transmission time.

8. The STA of claim 7,
wherein the processor is configured to set a network allocation vector (NAV) to 0 if the second ACK is not received within the second ACK transmission time.

9. The STA of claim 7,
wherein the second ACK transmission time is a short interframe space (SIFS).

10. The STA of claim 7, wherein the processor is configured to:
decode the second ACK and
determine whether a receiver address (RA) field of the decoded second ACK corresponds to an identifier of the STA.

11. The STA of claim 7,
wherein the short probe request frame includes only a medium access control (MAC) header and a frame check sequence (FCS),
wherein the MAC header includes an address field, and
wherein the address field includes a basic service set identifier (BSSID) of the AP.

12. The STA of claim 7,
wherein the short probe request frame includes a transmitter address (TA) field,
wherein the TA field includes identifier information of the STA transmitting the short probe request frame, and
wherein the first ACK includes a receiver address (RA) field determined based on the identifier information of the STA.

* * * * *